United States Patent
Potter et al.

(10) Patent No.: US 12,271,318 B2
(45) Date of Patent: Apr. 8, 2025

(54) METHOD AND APPARATUS FOR MANAGING A CACHE DIRECTORY

(71) Applicant: Advanced Micro Devices, Inc., Santa Clara, CA (US)

(72) Inventors: Brandon K. Potter, Austin, TX (US); Marko Scrbak, Austin, TX (US); Sergey Blagodurov, Seattle, WA (US); Kishore Punniyamurthy, Austin, TX (US); Nathaniel Morris, Columbus, OH (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/135,657

(22) Filed: Dec. 28, 2020

(65) Prior Publication Data

US 2022/0206946 A1 Jun. 30, 2022

(51) Int. Cl.
*G06F 12/12* (2016.01)
*G06F 12/0817* (2016.01)

(52) U.S. Cl.
CPC .......... *G06F 12/12* (2013.01); *G06F 12/0817* (2013.01); *G06F 2212/622* (2013.01)

(58) Field of Classification Search
CPC ...... G06F 12/12; G06F 12/08; G06F 12/0806; G06F 12/0811; G06F 12/084; G06F 12/0842; G06F 12/0893; G06F 12/0895; G06F 12/0897; G06F 2212/62; G06F 3/061; G06F 3/0611; G06F 3/0613; G06F 3/0635; G06F 3/064; G06F 3/0656; G06F 3/0673; G06F 12/06

See application file for complete search history.

(56) References Cited

U.S. PATENT DOCUMENTS

| | | | | |
|---|---|---|---|---|
| 5,442,571 A | * | 8/1995 | Sites ................... | G06F 12/0864 711/E12.063 |
| 5,630,097 A | * | 5/1997 | Orbits .................... | G06F 12/10 710/33 |
| 5,752,261 A | * | 5/1998 | Cochcroft, Jr. ..... | G06F 12/0864 711/128 |
| 9,093,160 B1 | * | 7/2015 | Ellis ........................ | G11C 5/14 |

(Continued)

FOREIGN PATENT DOCUMENTS

EP 3462320 A1 4/2019

OTHER PUBLICATIONS

Physical Address Decoding in Intel Xeon v3/v4 CPUs: A Supplemental Datasheet by Hillenbrand (Year: 2017).*
Memory Systems, Jacob; 2008 (Year: 2008).*
Cambridge Dictionary Definition of Evicted 2023 (Year: 2023).*

(Continued)

*Primary Examiner* — Paul M Knight

(57) ABSTRACT

Method and apparatus monitor eviction conflicts among cache directory entries in a cache directory and produce cache directory victim entry information for a memory manager. In some examples, the memory manager reduces future cache directory conflicts by changing a page level physical address assignment for a page of memory based on the produced cache directory victim entry information. In some examples, a scalable data fabric includes hardware control logic that performs the monitoring of the eviction conflicts among cache directory entries in the cache directory and produces the cache directory victim entry information.

24 Claims, 6 Drawing Sheets

(56) References Cited

U.S. PATENT DOCUMENTS

| | | | | |
|---|---|---|---|---|
| 2007/0234003 | A1* | 10/2007 | Naruse | G06F 12/10 |
| | | | | 711/202 |
| 2008/0052468 | A1* | 2/2008 | Speirs | G06F 13/4059 |
| | | | | 711/132 |
| 2008/0065864 | A1* | 3/2008 | Akkary | G06F 9/3004 |
| | | | | 712/225 |
| 2010/0217952 | A1* | 8/2010 | Lyer | G06F 12/127 |
| | | | | 711/E12.078 |
| 2016/0371182 | A1* | 12/2016 | Herrmann | H04L 49/90 |
| 2017/0351433 | A1* | 12/2017 | Walker | G06F 3/0656 |
| 2019/0163630 | A1* | 5/2019 | Gray | G06F 11/3037 |
| 2020/0019513 | A1* | 1/2020 | Kozhikkottu | G06F 12/1054 |
| 2020/0065246 | A1* | 2/2020 | Boyer | G06F 12/0842 |
| 2020/0104251 | A1* | 4/2020 | Boals | G06F 12/0246 |
| 2020/0371964 | A1* | 11/2020 | Bhoria | G11C 5/066 |
| 2021/0240631 | A1* | 8/2021 | Joo | G06F 12/0811 |

OTHER PUBLICATIONS

Definition of Produce by Merriam-Webster 2023 (Year: 2023).*
SRM-Buffer: An OS Buffer Management Technique to Prevent Last Level Cache from Thrashing in Multicores by Ding (Year: 2011).*
Banshee: Bandwidth-Efficient DRAM Caching via Software/Hardware Cooperation by Yu (Year: 2017).*
SecDir: A Secure Directory to Defeat Directory Side-Channel Attacks by Yan (Year: 2019).*
NPL Haubenschild Rethinking Logging Checkpoints and Recovery 2020.*
International Search Report and Written Opinion, PCT/US2021/064323, Apr. 14, 2022, 14 pages.
Mccalpin, HPL and DGEMM Performance Variability on the Xeon Platinum 8160 Processor, SC18: International Conference for High Performance Computing, Networking, Storage and Analysis, IEEE, Nov. 11, 2018 (Nov. 11, 2018), pp. 225-237, Dallas, Texas, USA.

* cited by examiner

METHOD AND APPARATUS FOR MANAGING A CACHE DIRECTORY

BACKGROUND OF THE DISCLOSURE

Increasing processing core counts in integrated circuits and increasing their cache sizes are putting pressure on how much silicon can be allocated to cache directories. Chips have dozens of cores and very large caches (relative to older chips). The cache directories to track the caches are taking more valuable silicon real estate. Cache directories, also referred to as a probe filter (PF), are used to track all of the cache lines that are cached in the system. One technique for trying to avoid directory caches from taking up too much silicon real estate has been to increase their granularity to extend their reach from lines to pages which can cause performance tradeoffs, also referred to as a page probe filter (PPF). However, eviction conflicts in cache directories can cause un-desirable latencies and can reduce system performance. Any latency issues in workload performance is a problem in data processing systems and other environments.

For example, some systems employ a cache directory, that is a page level, set-associative cache that is indexed using bits from the Physical Address (PA). Under certain conditions, the PPF can experience many conflicts on frequently accessed (hot) sets, resulting in PPF evictions (called downgrades). Downgrades are expensive in terms of performance. For each downgrade, the PPF needs to issue invalidation probes to the core complexes caching the lines of the page being tracked by the evicted PPF entry. This will also result in potential writebacks to memory for all the dirty cache lines being invalidated.

For example, today's CPU system on chips (SoCs) have hundreds of megabytes of last level caches (LLCs) and this trend is going to continue. For this reason, traditional line-based cache directories, which are used for coherence, are being replaced by coarse-grained cache directories operating on a larger page level granularity (e.g. 2 KB/4 KB). These directories keep track of all the cache lines cached in the system. Albeit large, they are still subject to the same limitations as the caches they are tracking. They are set-associative structures with limited capacity and will experience set conflicts for large memory intensive applications.

BRIEF DESCRIPTION OF THE DRAWINGS

The implementations will be more readily understood in view of the following description when accompanied by the below figures, wherein like reference numerals represent like elements, and wherein.

Figure 1:
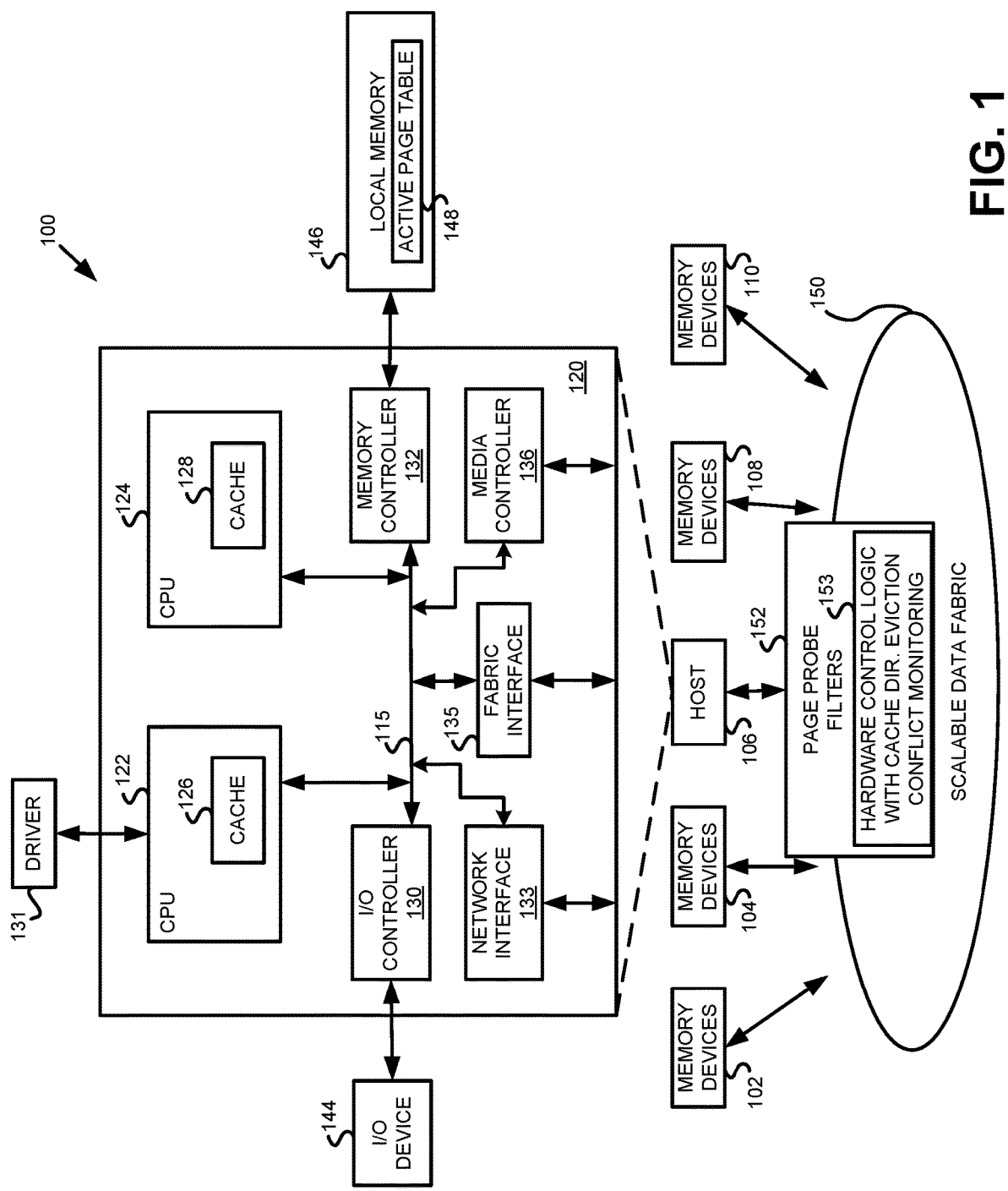
FIG. 1 illustrates in block diagram example of a data processing system according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF IMPLEMENTATIONS

Methods and apparatus keep track, in some implementations, of all pages currently resident in cache memory (e.g., level L3) including cache line accesses to a page of memory. In some implementations, cache directory entries, such as set conflicts in a set-associative cache directory, are monitored for eviction conflicts and the information is exposed to rebalance the memory system. In certain implementations, the eviction conflict information is exposed to one or more of an operating system (OS), a hypervisor (HV), a memory controller or other page memory manager. In some implementations, future physical page (e.g., frames) memory allocations by the memory manager are changed to avoid evictions in the cache directory to improve performance of the cache directory and hence overall system performance.

In some implementations, a method for managing a cache directory includes monitoring eviction conflicts among cache directory entries in the cache directory and producing cache directory victim entry information for a memory manager. In some examples, the memory manager reduces future cache directory conflicts by changing a page level physical address assignment for a page of memory based on the produced cache directory victim entry information.

In certain examples, the cache directory is a page level set-associative cache directory wherein each entry corresponds to a page of memory and wherein producing cache directory victim entry information includes logging cache directory victim entry information for the at least one of eviction conflicts in memory. In some examples, the monitoring of eviction conflicts in the cache directory includes reading a conflict victim buffer that stores a most recently evicted entry from the cache directory.

In certain examples, logging includes storing the cache directory victim entry information for the at least one of evicted entries in a kernel memory readable by a virtual memory manager. In some examples, logging includes storing the cache directory victim entry information for the at least one of evicted entries in a hardware log buffer readable by the control logic.

In certain examples, the method includes reducing congestion for a memory channel based on the produced cache directory victim entry information for the at least one of evicted entries by assigning a physical address for a page of memory to a different memory channel based on the produced cache directory victim entry information.

In some examples the method includes reducing, by the memory manager, cache directory conflicts by changing a page level physical address assignment for a page of memory to effect movement to a different set in the page level set-associative cache directory.

In certain examples, configuration registers are used to control operational settings and the method includes setting one or more configuration registers with data representing one or more of: a multi-mode operation of cache eviction monitoring including a first mode that provides continuous logging of eviction conflicts and a second mode that provides logging of eviction based on a condition data being met, a sampling rate of a number of conflict evictions that are logged, and a count setting that sets a number of eviction conflicts that are stored.

In some examples, the method includes producing cache directory victim entry information for a plurality of eviction conflicts detected in the cache directory, such as by logging information for multiple victim entries in the cache directory which are processed by a memory manager to determine how best to change future physical memory page address allocations to reduce eviction conflicts in the cache directory.

In certain implementations, an apparatus includes one or more processors that access a cache hierarchy, memory that stores a cache directory and hardware control logic that monitors eviction conflicts among cache directory entries in the cache directory. The hardware control logic produces cache directory victim entry information for a memory manager. In some examples, a scalable data fabric includes the hardware control logic.

In some examples, the cache directory is a page level set-associative cache directory wherein each entry corresponds to a page of memory and wherein the hardware control logic includes a conflict victim buffer that stores a most recent entry evicted from the cache directory. A controller produces cache directory victim entry information from the victim buffer by logging cache directory victim entry information for at least one of the eviction conflicts in memory readable by a memory manager.

In certain examples, the hardware control logic includes a hardware log buffer that is readable and writeable by the controller and the controller stores the cache directory victim entry information for the at least one of evicted entries in the hardware log buffer. In some examples, a memory manager reduces future cache directory conflicts by changing a page level physical address assignment for a page of memory based on the produced cache directory victim entry information.

In certain examples, configuration registers are configured to provide control of the controller with data representing at least one of: a multi-mode operation of cache eviction monitoring including a first mode that provides continuous logging of eviction conflicts and a second mode that provides logging of eviction based on a condition data being met, a sampling rate of a number of conflict evictions that are logged, and a count setting that sets a number of eviction conflicts that are stored.

In certain implementations, a data processing system includes a host processor, a memory coupled to the host processor, a plurality of remote memory devices, and a scalable data fabric, wherein the scalable data fabric includes hardware control logic that monitors eviction conflicts among cache directory entries in the cache directory, and produces cache directory victim entry information for a memory manager.

In some examples, the host processor, that provides an operating system or hypervisor, that reduces future cache directory conflicts by changing a page level physical address assignment for a page of memory based on the produced cache directory victim entry information.

In certain examples, the cache directory is a page level set-associative cache directory wherein each entry corresponds to a page of memory and wherein the hardware control logic includes a conflict victim buffer configured to store a most recent entry evicted from the cache directory, and a controller produces cache directory victim entry information from the victim buffer by logging cache directory victim entry information for at least one eviction conflict in memory readable by a memory manager.

In some examples, the hardware control logic includes a log buffer that is readable and writeable by the controller and the controller stores the cache directory victim entry information for the at least one of evicted entries in the log buffer.

In certain examples, configuration registers configured to provide control of the controller with data representing at least one of a multi-mode operation of cache eviction monitoring including a first mode that provides continuous logging of eviction conflicts and a second mode that provides logging of eviction based on a condition data being met, a sampling rate of a number of conflict evictions that are logged, and a count setting that sets a number of eviction conflicts that are stored. In some examples, the controller stores the cache directory victim entry information for the at least one of evicted entries in a kernel memory readable by a memory manager.

In certain examples, a memory manager reduces congestion for a memory channel based on the produced cache directory victim entry information for the at least one of evicted entries by assigning a physical address for a page of memory to a different memory channel based on the produced cache directory victim entry information.

In some examples the memory manager reduces cache directory conflicts by changing a page level physical address assignment for a page of memory to effect movement to a different set in the page level set-associative cache directory.

FIG. 1 illustrates in block diagram form, a data processing system 100 according to some embodiments. Data processing system 100 includes a host 106 and memory devices 102, 104, 108, and 110 connected together by a scalable data fabric 150. Host 106 includes a host processor 120 having two central processing unit (CPU) 122 and 124 with associated caches 126 and 128, respectively, an input/output (I/O) controller 130, a driver 131, a memory controller 132, a network interface 133, a fabric interface 135, and a media controller 136. I/O controller 130 connects an associated I/O device 144 to host processor 120. In the illustrated example, I/O controller 130 implements a non-coherent form of the HyperTransport protocol to receive and store data that is not cached in data processing system 100. Network interface 133 is connected to a system interconnect 115 and implements a coherent form of the HyperTransport protocol. Memory controller 132 is connected to a local memory 146. In the illustrated embodiment, local memory 146 is implemented with DRAM.

System interconnect 115 connects CPU 122 and 124, I/O controller 130, memory controller 132, network interface 133, fabric interface 135, and media controller 136. In this example, host processor 120 includes two CPU 122 and 124, but in other embodiments, host processor 120 can include an arbitrary number of CPU cores. Each of caches 126 and 128 is bidirectionally connected to system interconnect 115 and is capable of providing memory access requests such as cache line fills, writebacks, and probe requests and responses to scalable data fabric 150 via memory controller 132 and fabric interface 135. Each of CPU 122 and 124 may be a unitary core or may further be a core complex with two or more unitary cores sharing certain resources such as caches 126 and 128. System interconnect 115 includes a crossbar switch for routing memory access requests and memory responses between any memory accessing agent and memory controller 132. System interconnect 115 also maintains a system memory map for determining destinations of memory accesses based on the system configuration, as well as various transaction buffers.

Memory devices 102, 104, 108, and 110 are remote data storage agents that provide access to data in external memory pools via scalable data fabric 150 which is shared between multiple compute agents such as CPUs 122 and 124.

Driver 131 is, for example, a module of an operating system (OS) kernel that serves a memory manager that makes page placement decisions based on information about memory access patterns. For example, driver 131 relocates the pages most frequently accessed by host processor 120 from other pools in scalable data fabric 150 to local memory 146.

Memory controller 132 is the mechanism for data transfer between host processor 120 and all memory in the system, including local memory 146 and memory devices 102, 104, 108, and 110. Memory controller 132 is connected to and receives memory access requests from memory accessing agents over system interconnect 115. Memory controller 132 offloads the task of initiating and terminating memory accesses from CPU 122 and 124. Memory controller 132 also includes a media controller for local memory 146 having internal queues to allow efficient use of the external bus to local memory 146. In the illustrated embodiment, local memory 146 is implemented using DRAM, but could be implemented by other types of memory besides DRAM, such as static RAM, nonvolatile memory, or any suitable type of memory.

I/O device 144 is an input/output device that functions as a producer of non-cacheable data. In the example shown in FIG. 1, I/O device 144 complies with the non-coherent form of the HyperTransport™ I/O Link Specification, Revision 1.03, © 2001 HyperTransport Technology Consortium.

Local memory 146 is connected to host processor 120 through memory controller 132. In other embodiments, local memory 146 can be implemented with other forms of memory such as high band width memory (HBM), phase-change memory (PCM), and other similar types of page-oriented memory. Local memory 146 includes active page table 148 that stores information locally to host processor 120 to help driver 131 make page migration decisions.

Scalable data fabric 150 is a hierarchical interconnect that provides data transfer between low-latency memory pools, such as memory devices 102, 104, 108, and 110 and host processor 120. Scalable data fabric 150 utilizes a packet-based protocol, such as the coherent HyperTransport (cHT) protocol, to provide a latency-insensitive load-store interface between processing elements and memory modules. Scalable data fabric 150 is scalable per component and the components do not have to be directly attached to host processor 120. Instead the components can be connected via switched or scalable data fabric topologies with gateways to other networks (e.g. Ethernet and InfiniBand networks). Scalable data fabric 150 also facilitates the use of higher latency non-volatile random-access memory (NVRAM) and other memory types. In these memories, the write latency tends to be larger than the read latency. In one embodiment, scalable data fabric 150 implements a protocol developed by the GenZ Consortium. However scalable data fabric 150 could implement any other similar protocol.

Scalable data fabric 150 includes a set of one or more page probe filters 152. In the exemplary embodiment that will be described further below, page probe filters 152 store information indicating locations of data elements that are cached anywhere in the system, and other filters that track non-cacheable memory accesses. As set forth below, hardware control logic 153 with cache directory eviction conflict monitoring in some implementations is included as part of a page probe filter.

In the illustrated embodiment, driver 131 runs on CPU 122 and periodically scans active page table 148 and a log file (e.g., that includes cache directory eviction conflict data) to determine which pages being accessed by CPU 122 and 124 are currently stored in a slower or more remote memory, e.g. one of memory devices 102, 104, 108, and 110, or slower memories within the local memory and utilizes a system call known as "movepage" to migrate selected pages to local memory 146. In some implementations, the driver 131 and the memory controller move pages between the memory devices 102, 104, 108 and 110. In certain implementations where the local memory is made of up different types of memory devices (some slower and others faster) pages are moved within the local memory. Thus, driver 131 in conjunction with the memory controller 132 opportunistically moves data to improve the locality of data placement in a system with a complex, scalable data fabric.

Figure 2:
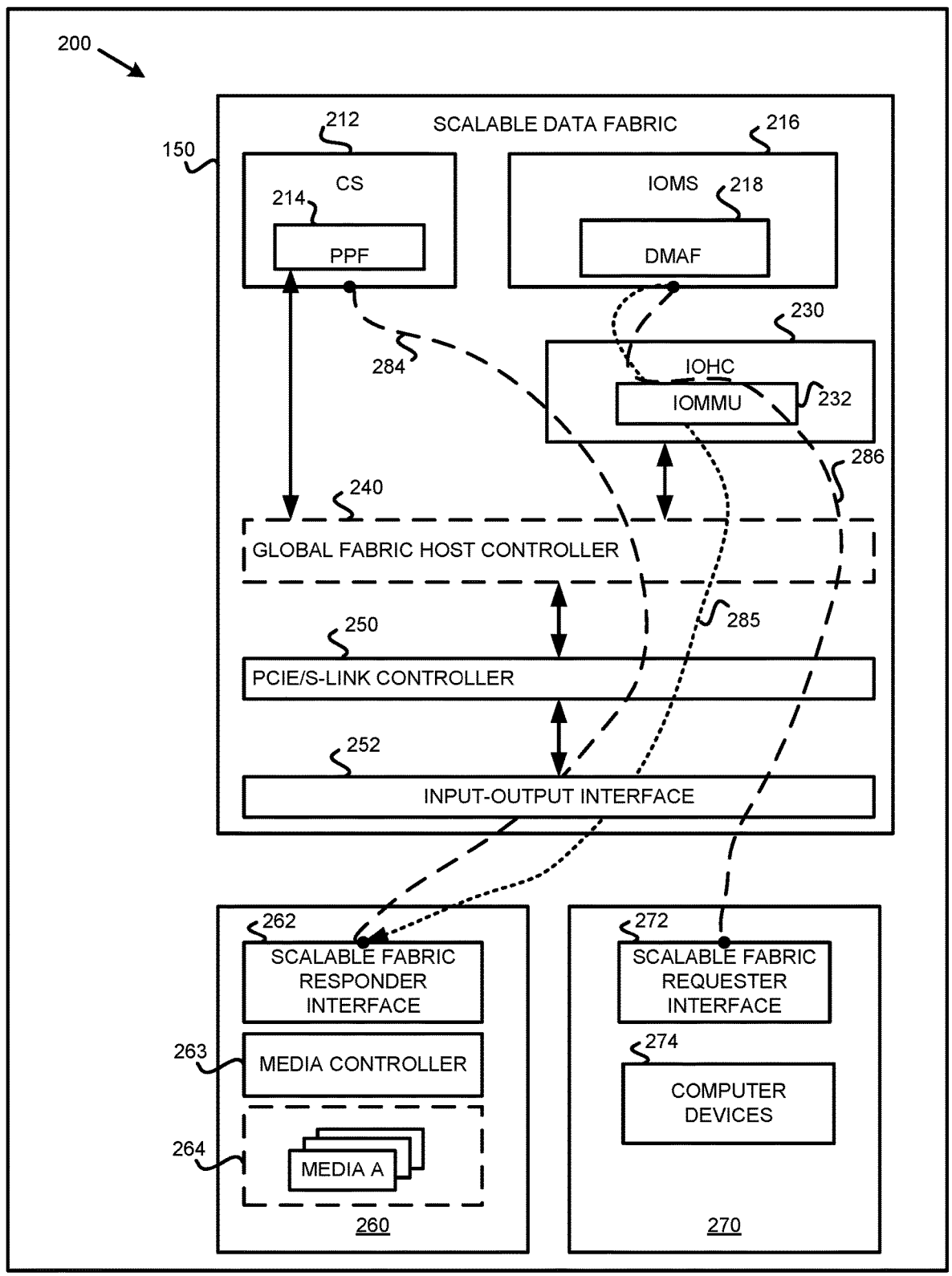
FIG. 2 is a block diagram illustrating one example of an extended scalable fabric system for use in a data processing system in accordance with one example set forth in the disclosure.

FIG. 2 illustrates in block diagram form an extended scalable fabric system 200 for use in data processing system 100 of FIG. 1 according to some embodiments. Extended scalable fabric system 200 includes generally scalable data fabric 150, a responder network 260, and a requester network 270 including host processor 120 (not specifically shown in FIG. 2).

Scalable data fabric 150 includes generally a coherent slave (CS) 212, an input/output master/slave (IOMS) 216, an input/output host controller (IOHC) 230, a global fabric host controller 240, a Peripheral Component Interconnect express (PCIe)/S-link controller 250, and an input/output interface 252. CS 212 manages coherence for all the physical memory associated with scalable data fabric 150. CS 212 acts as a scalable ordering point for memory access and guarantees scalable visibility for memory accessing agents associated with extended scalable fabric system 200. Further, CS 212 enables address serialization and launches probes for coherence purposes. CS 212 is responsible for maintaining ordering and coherency for received memory access requests. CS 212 implements a cache coherency protocol, such as coherent HyperTransport (cHT). CS 212 interfaces with memory controller 132 through a socket direct protocol (SDP) port. CS 212 includes hardware control logic, in this example in the form of a page probe filter (PPF) 214 with cache entry eviction conflict monitoring that is a hardware filter circuit that enables a global view of all recently accessed pages. In some implementations, PPF 214 includes a list of all pages which are actively cached anywhere in data processing system 100. PPF 214 tracks the memory corresponding to the DRAM addresses owned by the memory channel associated with CS 212. To facilitate page movement decisions, PPF 214 exposes selected information from its tag and data arrays, directly or indirectly, to driver 131 of the operating system.

IOMS 216 is a module that serves accesses to memory associated with scalable data fabric 150 and is also an entry point of all direct memory access (DMA) (non-cacheable) memory requests from scalable data fabric 150 to host processor 120. IOMS 216 includes a DMA filter (DMAF) 218 that, like PPF 214, is a hardware filter circuit. IOMS 216 contains both master and slave functionality and hence has two SDP ports: (i) a master SDP for DMA accesses from an I/O device, and (ii) a slave SDP for downstream accesses from host processor 120 to a media memory device. DMAF 218 tracks memory accesses going through IOMS 216 via the two SDP ports. To facilitate data movement decisions, DMAF 218 exposes this information, directly or indirectly, to driver 131 of the operating system.

Driver 131 periodically scans active page table 148 and uses the data from a log file that includes cache directory eviction conflict data and other data as described below to determine what physical memory page allocations should be changed based on a re-allocation policy change so that the page causing the page directory conflict is changed to one having a different physical memory allocation to reduce future eviction conflicts in the cache directory.

In some implementations the system allows for moving of pages to different tiers of memory. For example, data movement candidates could be data currently cached in slow non-volatile RAM (NVRAM) or memory in extended scalable fabric system 200. In some implementations instead of the memory controller 132 moving pages, the scalable fabric 150 includes a DMA engine that utilizes a predetermined system call, e.g. the "movepage" system call, to migrate the pages to local memory 146. In other implementations, the operating system controls movement of pages from a current memory that is slow to a faster memory.

IOHC 230 includes an input/output memory management unit (IOMMU) 232 to translate local memory addresses into corresponding system addresses. Global fabric host controller 240 is connected to both CS 212 and IOMS 216 (through IOHC 230) and has a port for receiving requests from and providing responses to fabric-attached requestors. Global fabric host controller 240 may include a separate address translation mechanism and performs link control using link-defined protocols, such as the GenZ protocol.

PCIe/S-link controller 250 performs lower-level communication between the components in extended scalable fabric system 200 using the packet-based protocol known as the "PCI Express" (PCIe) protocol defined by the PCI Special Interest Group. In an alternative embodiment, PCIe/S-link controller 250 could implement any other similar link protocol that is capable of operating between components connected in a hierarchy.

Input/output interface 252 provides buffering and physical interfaces between components in scalable data fabric 150 and requestors and responders connected to it.

In one embodiment, the components of scalable data fabric 150 are combined in one integrated circuit (IC) and the components of host processor 120 in another IC. In an alternate embodiment, all of these circuits are combined in a single IC.

Responder network 260 includes, generally, a scalable fabric responder interface 262, a media controller 263, and a media group 264. Scalable fabric responder interface 262 communicatively connects to scalable data fabric 150 and enables access to remote memory pools such as media groups 264. Media controller 263 provides an interface to particular types of media, such as DRAM, NVRAM, Flash memory, and the like. Media group 264 includes a set of remote memory devices. Each of remote memory devices can include, for instance, a computing device at a location remote to host processor 120. Responder network 260 provides data to and receives data from remote memory devices via scalable data fabric 150.

Requester network 270 includes a scalable fabric requester interface 272, and one or more compute devices 274, such as host processor 120 of FIG. 1. Each compute device 274 is a memory accessing agent that provides requests to scalable data fabric 150.

Extended scalable data fabric system 200 improves efficiency of data placement in data processing system 100 by making information stored in PPF 214 and DMAF 218 visible to the operating system. Thus the operating system can make opportunistic page migration decisions and thereby dynamically improve the locality of data accesses. Hardware control logic stores data in a log file, as set forth below, that is accessible only by the operating system to make opportunistic page migration decisions.

In one example of data flow, an access to media memory is received at scalable data fabric 150. Line 284 illustrates a path of the access from CS 212 to media memory. PPF 214 stores information indicating a location of the data that is cached by the data processing system. The information associated with the data can be stored in the form of a data array. Alternatively, line 285 illustrates a request to migrate uncacheable data to media memory. DMAF 218 stores information indicating a location of the data that is not cached by the data processing system. In another embodiment, line 286 represents a path in which scalable data fabric 150 receives a memory access request from a compute device 274. The path of migration provides the information associated with the data to IOMS 216 via IOMMU 332. PPF 214 and DMAF 218 can each store the information that characterizes the data in a combined data array or separate data arrays.

Hardware control logic 153 logs cache directory victim entry information as part of the PPF 214 to make it easy for a memory manager such as a processor implementing driver 131, an operating system or a hypervisor to make future physical page memory allocations for an application or other operation that is running. In some implementations memory channel traffic is reduced by operating system or a hypervisor choosing alternate physical page memory allocations based on the exposed cache directory victim entry information.

Figure 3:
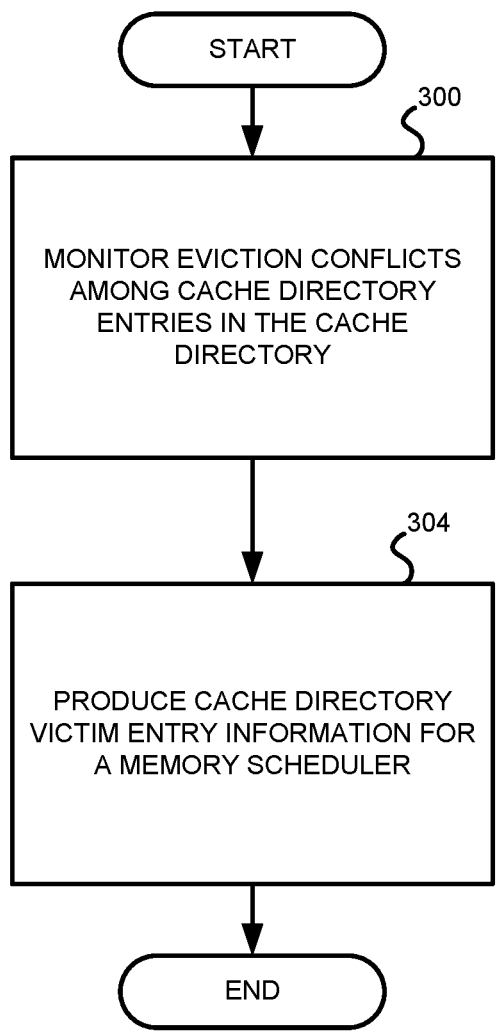
FIG. 3 is a flowchart illustrating a method for managing a cache directory according to an example set forth in the disclosure.
Figure 4:
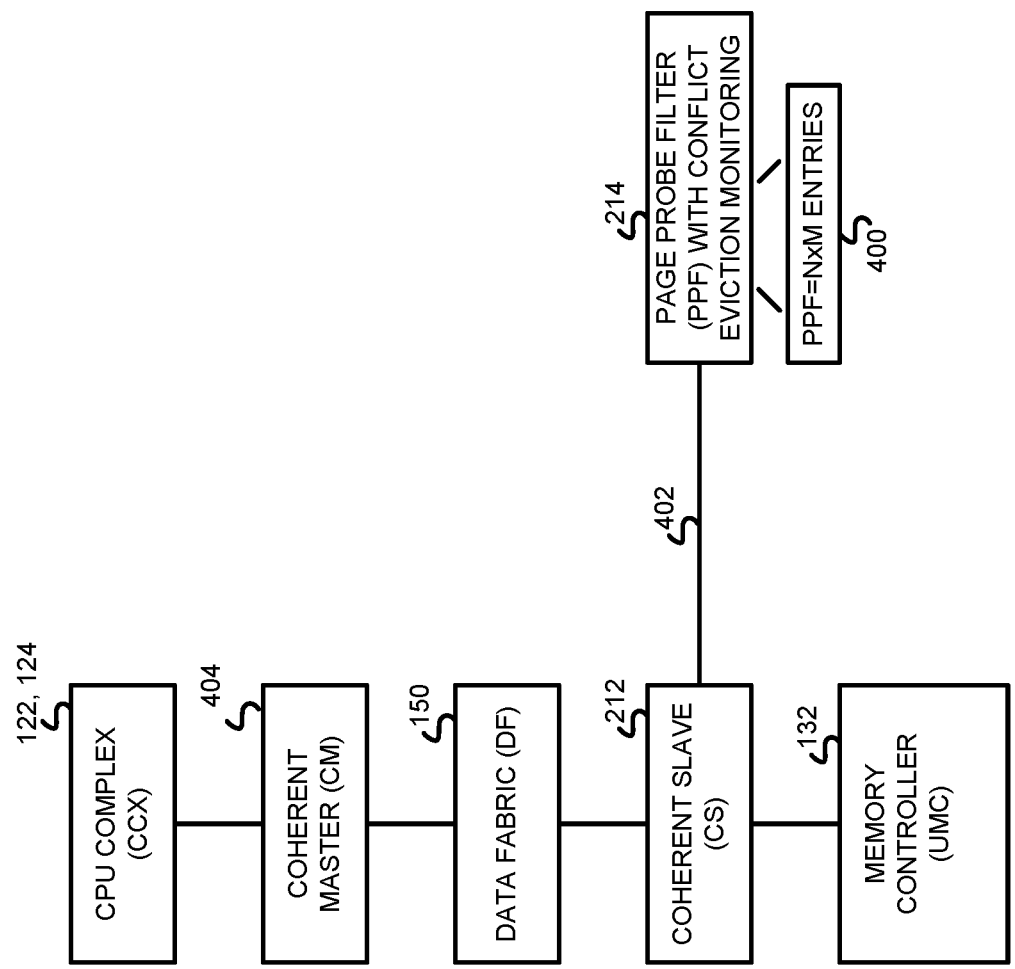
FIG. 4 is a block diagram illustrating one example of a data processing system according to an example set forth in the disclosure.

FIG. 3 is a flowchart illustrating one example of a method for managing a cache directory that in one example is carried out by the hardware control logic 153. However, any suitable control logic may be employed. Also it will be recognized that the operations may be performed in any suitable order and that the below operations are given as examples. As shown in block 300, the method includes monitoring eviction conflicts among cache directory entries in a cache directory. In one example, as further described below, the hardware control logic 153 monitors a temporary hardware buffer that stores conflict victim entries that have been evicted from cache directory. As shown in block 304, the method includes producing cache directory victim entry information for a memory manager, such as for a memory manager that allocates physical address space for pages of memory, such as an operating system, hypervisor or other suitable physical address memory manager. The memory manager reduces future cache directory conflicts by choosing more optimal physical pages for future memory assignments. Some examples of memory manager policies that are employed include reassigning the page to a different set within the channel when hot spots are detected on a single set within a channel, such as where many cache entry evictions are occurring in the same set. If many hot spots on many sets within a channel are detected, the memory manager moves the page to a different channel entirely. Also, in some implementations, absence of conflicts is considered non-hot spotted pages.

In some implementations, the hardware control logic 153 is part of the scalable data fabric 150. The memory manager can be, for example, an operating system (a CPU executing operating system code) and/or fixed function hardware such as a memory controller, to monitor cache directory set conflicts and use the information to rebalance the memory system. For example, the produced cache directory victim entry information provides feedback, in one implementation, to an operating system virtual memory manager (VMM) which in turn allocates page frames more intelligently. This improves the performance of the cache directory and improves overall system performance. In some implementations, the produced cache directory victim entry information is exposed to both an operating system or hypervisor as well as fixed function hardware such as a memory controller as further described below.

In some implementations, a virtual memory manager chooses a virtual address to physical address mapping in a way that is cognizant of potential conflicts in the cache directory sets. The virtual memory manager keeps track of pages mapped for each cache directory set which in one example, the information is added to a kernel page data structure that is stored in a kernel memory, as an additional field.

Referring to FIGS. 4-7, an example structure and operation of the hardware control logic 153 will be described and in this example, the hardware control logic 153 is implemented as a page probe filter 214 with conflict eviction monitoring. In some implementations, the page probe filter 214 utilizes a data fabric cache directory 400 that includes entries that form a list of all pages which are actively cached anywhere in the system. The page probe filter 214 is logically a part of the coherent slave (CS) module. The PPF 214 is logically associated with a channel and a memory controller. The PPF 214 tracks the memory corresponding to the memory addresses owned by the associated CS memory channel. The coherent master (CM) 404 is the interface between a CPU complex (CCX), consisting of multiple CPU 122, 124 and the data fabric 150. The CPU complex access a cache hierarchy. The coherent master (CM) 404 receives requests from the CPU 122, 124 and forwards them to the data fabric 150. The coherent master (CM) 404 receives coherency probes and probe responses from the data fabric 150 and sends them to the CPU complex (CCX).

Figure 5:
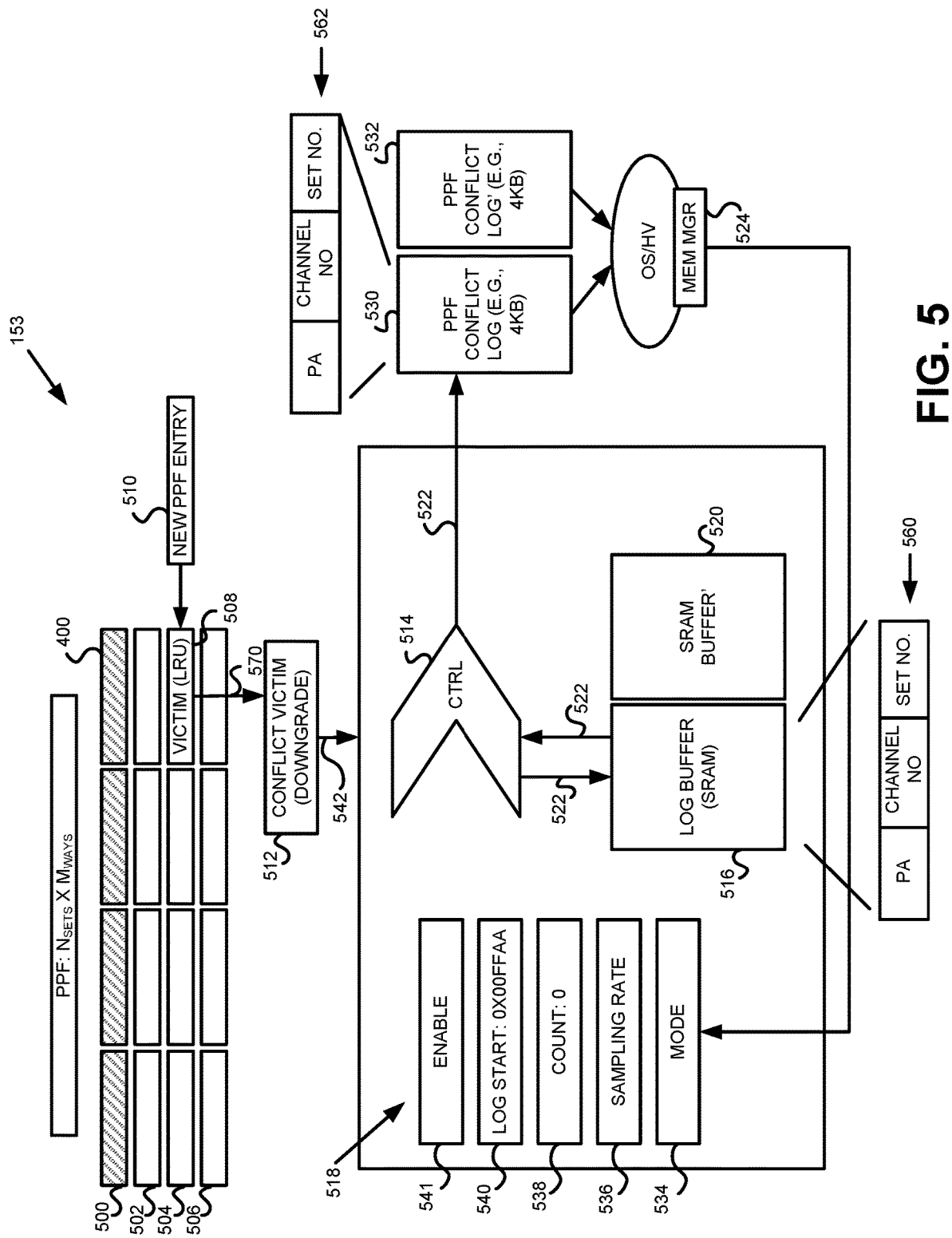
FIG. 5 is a block diagram illustrating one example of hardware control logic in accordance with one example set forth in the disclosure.

As shown in FIG. 5, as an example, each set 500-506 is a set in a page level set-associative cache directory wherein each entry 508 corresponds to a page of memory. In this example, entry 508 of set 504 has an eviction conflict and is a conflict victim. A new PPF entry 510 is placed in the set 504. The new PPF entry 510 represents a new cache line for example in a page that is being used by an application running in the CPU complex.

In this example, the hardware control logic 153 includes a conflict victim buffer 512, a controller 514, a log buffer 516, one or more control registers 518. In some implementations, the log buffer 516 is configured with a double buffer 520. The hardware control logic 153, in one example, is configured as one or more state machines, in other implementations, it is implemented as a field programmable gate array, in other implementations, it is implemented as a microcontroller executing firmware, however any suitable structure may be used including any suitable combination of hardware logic including processors that execute instructions may also be employed.

The controller 514 produces cache directory victim entry information 522 for a memory manager 524. In this implementation, the memory manager 524 is implemented by an operating system and/or hypervisor (e.g., one or more processors executing operating system code and/or hypervisor code). In some implementations, the hardware control logic 153 exposes the cache directory victim entry information 522 to the memory manager 524, through a kernel memory 530 (e.g., buffer). In some implementations, the kernel memory may include a double buffer 532. The kernel memory 530 stores a cache directory conflict log that includes the cache directory victim entry information 522.

The conflict victim buffer 512 stores a most recent entry evicted from the cache directory 400, in this example shown as entry 508. The controller 514 produces the cache directory victim entry information 522 by logging cache directory victim information 542 that is stored in the conflict victim buffer 512. The controller produces a cache directory victim entry information 522 in memory, such as kernel memory 530 that is readable by a memory manager 524. The controller 514 also stores the cache directory victim entry information 522 in the log buffer 516 that is readable and writable by the controller 514. In some implementations, the controller 514 also stores the cache directory victim entry information 522 in the kernel memory 530. In some examples, the information 542 is the same information as victim entry information 522. The memory manager 524 reduces future cache directory conflicts by changing a page level physical address assignment for a page of memory based on the produced cache directory victim entry information 522 by processing the victim entry information 522 from the kernel memory 530 in this example. In some examples, the kernel memory includes a directory that when populated, notifies the memory manager.

The configuration registers 518 provide control of the controller 514 and include in some implementations, a mode register 534 that includes data representing multimode operation of cache eviction monitoring including a first mode that provides continuous logging of eviction conflicts, and a second mode that provides logging of evictions based on condition data being met, such as one or more thresholds being met. A sampling rate register 536 includes data representing a sampling rate of a number of conflict evictions to be logged by the controller 514. A count register 538 includes data representing a count setting that sets a number of eviction conflicts that are to be stored by the controller 514. A log start register 540 includes data representing a start address of the log in the conflict log stored in kernel memory 530. An enable register 541 allows the eviction monitoring operation to be enabled or disabled as desired. The control registers are set through driver control or through any other suitable operation.

Entry 560 is one example of an entry of a log in the log buffer 516. Entry 562 is an example of an entry in the conflict log stored in kernel memory 530. In some implementations each entry includes data representing a physical address (PA), a channel number (CN) and a set number (SN). For example an entry could be PA (Physical Address) 0x4C54BBF000 (assuming 40 bit addressing for PA), Channel number 3, (assuming 16 channels), and Set number 148 (assuming 256 sets) for a format of |4c54bbf000 | 3 | 148 |.

Figure 6:
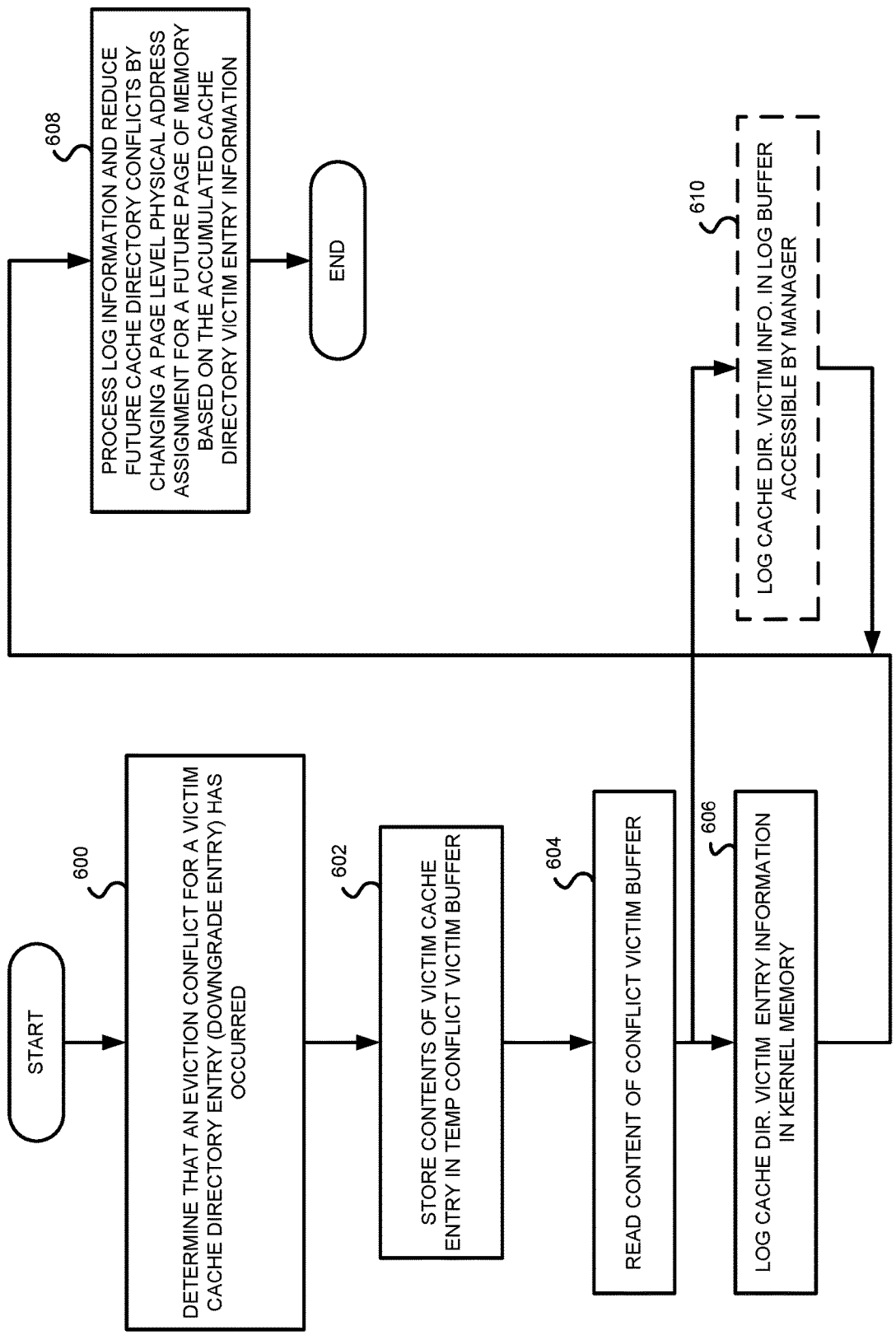
FIG. 6 is a flowchart illustrating a method for managing a cache directory according to an example set forth in the disclosure.

FIG. 6 illustrates one example of a method for managing a cache directory based on one example of the operation of the block diagram shown in FIG. 5. It will be recognized that the operations may be performed by any other suitable logic and may be performed in any suitable order. As shown in block 600, the method includes determining that an eviction conflict for a victim cache directory entry has occurred. For example, when a new PPF entry needs to be allocated in a PPF set and there are no free or invalid entries, resulting in a conflict miss, the hardware control logic chooses a victim entry 508 based on a replacement policy, such as a least recently used (LRU) policy. In one example, L3 cache lines belonging to that entry are invalidated. As shown in block 602, the method includes storing contents of the victim cache entry in the temporary conflict victim buffer 512 as shown by arrow 570. The controller 514, as shown in block 604, reads the content of the conflict victim buffer 512 and decides, based on the configuration register settings which information to log, where to log it and how to log it. For example, in one configuration, the controller 514 samples PPF downgrades and logs only every $n^{th}$ victim as set for example by the value in the sampling rate register 536.

As shown in block 606, the method includes logging the cache directory victim entry information 522 in kernel memory 530. In some examples, the log is double buffered through double buffer 532 to ensure that the controller 514 continues to log the information while the memory manager 524 processes the log. As shown in block 608, the method includes processing the cache directory victim entry information 522 in the log and adjust a physical frame assignment, based on page coloring to reduce future conflicts (e.g., to make best use of the page probe filter cache). In one example, the memory manager 524 reduces future cache directory conflicts by changing a page level physical address assignment for a page of memory based on the cache directory victim entry information 522. In some implementations, the page reassignment is to move a page to an uncongested channel. In other implementations the page reassignment is to move the page to reduce contention on a single set in the PPF within the same channel.

As shown in block 610, in certain implementations, the controller 514 firsts logs the cache directory victim entry information 522 in the log buffer 516. In some implementations, this allows more control over monitoring/logging. The buffer resident logs in some implementations are double buffered as shown by buffer 520 to allow a more continuous storing of cache directory victim entry information.

The mode register 534, is configured to allow multiple modes to be set. In one example, a mode, referred to as monitor mode, is a mode in which conflicts are logged only when an issue is detected, such as the number of conflicts for a set to reach a threshold. In some implementations, a register is set by a memory manager or operating system or hypervisor that logs conflicts when they exceed the $95^{th}$ percentile within the past 100 epochs of one second each. Another mode, referred to as active log mode, consistently logs conflicts in the kernel memory 530. The active log mode would not require the log buffer 516 and can directly log conflicts into the kernel memory 530.

In some implementations, the hardware control logic 153 is configured with a sampling rate through sampling rate register 536 to log only every $n^{th}$ conflict. In some examples, this reduces the amount of space needed for the log and the amount of memory writes while preserving the overall informativeness provided by the hardware control logic 153 for the memory manager 524. The memory manager 524 processes the logs and implements page frame allocation policies based on page coloring to mitigate additional conflicts in the cache directory 400. An operating system, hypervisor in some examples, is responsible for enabling the hardware control logic 153 and setting/resetting the control registers, such as the log start register 540, sampling rate register 536, count register 538 and mode register 534. In some implementations, the conflict information is used to derive heuristics and use those heuristics to try to improve subsequent runs before conflicts start occurring. In some implementations, multiple modes are run and results compared to see their effectiveness and performance cost for implementation and the mode with the least performance cost is selected.

In some examples, rebalancing of the memory system can be retroactive or proactive in nature. Retroactive rebalancing in one example is performed by the memory manager remapping already mapped pages to a set of frames which map to a different memory channel. As such, reducing congestion for a memory channel occurs by changing a page level physical address assignment for a page of memory to a different memory channel based on the produced cache directory victim entry information. In other implementations, the memory manager reduces cache directory conflicts by changing a page level physical address assignment for a page of memory to effect movement to a different set in the page level set-associative cache directory.

Moving pages by the memory manager 524 (e.g., via OS) to another physical location has its cost (the translation lookaside buffer (TLB) shootdown) plus an additional cost of moving bytes if the new location is in another memory controller. That is why in some implementations, the memory manager will trigger rebalancing only when an issue is detected. In addition, in certain implementations, when migrating a page to a different physical location, the memory manager will first choose a new location within the same memory channel (e.g., different set in PPF for same memory controller to minimize the migration overhead), but may have to migrate to a different controller too to move to a different memory channel, if the current memory node is full or experiences a heightened number of conflicts in the probe filter.

For proactive rebalancing, in some implementations, the memory manager (e.g., OS) makes sure the allocated page frame addresses do not cause conflicts in the PPF set or memory channels. This is achieved in one example with the monitor mode of operation. For example by watching how a given application memory usage generates a PPF conflict profile, the OS/HV makes a decision offline for how to handle the application the next time it runs. For example, a virtual memory region known to be prone to PPF conflicts will be remapped into different PPF sets by the memory manager (e.g., VMM).

In another proactive approach, the hardware control logic 153 exposes the conflict information 522 to the OS/HV so that data is allocated to physical memory regions with no-to-few PPF conflicts. Memory addresses mapped to PPF sets that are considered too hot can be avoided by masking-out (temporarily disabling set bits associated with PPF conflicts) memory regions. The memory manager (VMM) treats the masked-out page frames as not free and will allocate new data to page frames that are available.

In other implementations, the PPF conflict monitoring information is used to alleviate congestions on the memory channels. For example, each memory controller has a PPF associated with it. That way, the memory manager (OS/HV/VMM) is also aware of any imbalances/congestion on the memory channels and allocates/remaps physical frames based on channel hotness. This is contrary to present systems, where low order bits are used for channel interleaving, and the OS remains oblivious to channel hotness and it is not able to adjust the memory mappings (allocate frames) accordingly. The channel hotness can be approximated as a sum of conflicts for all the PPF sets that belong to the channel. The rebalancing by the memory manager (e.g., OS/HV) will then periodically pick a page frame from the hottest channel and search for a channel with the lowest hotness at the moment.

As described above, in some implementations, cache directory entries, such as set conflicts in a set-associative cache directory, are monitored for eviction conflicts and the information is exposed to rebalance the memory system. In certain implementations, the eviction conflict information is exposed to one or more of an operating system (OS), a hypervisor (HV), a memory controller or other page memory manager. In some implementations, future physical page (e.g., frames) memory allocations by the memory manager are changed to avoid evictions in the cache directory to speed up cache directory operation and improve performance of the cache directory and hence overall system performance.

Although features and elements are described above in particular combinations, each feature or element can be used alone without the other features and elements or in various combinations with or without other features and elements. The apparatus described herein in some implementations are manufactured by using a computer program, software, or firmware incorporated in a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. A method for managing a cache directory in a system comprising:
    setting one or more configuration registers to control a multi-mode operation of cache eviction monitoring including either a first mode that provides continuous logging of eviction conflicts, or a second mode that provides logging of eviction conflicts based on one or more thresholds of conflict evictions being met:
    monitoring, by hardware control logic, eviction conflicts among cache directory entries in the cache directory, wherein the cache directory entries correspond to pages which are cached in the system;
    in response to an eviction of one or more cache directory entries in the cache directory, producing by the hardware control logic, cache directory victim entry information indicating one or more of the cache directory entries that have been evicted from the cache directory for a memory manager that assigns physical address space for pages of memory in the system; and
    choosing a future page of memory from the physical address space based on the produced cache directory victim entry information.

2. The method of claim 1 further comprising changing a page level physical address assignment for a page of memory to a different memory channel based on the produced cache directory victim entry information.

3. The method of claim 1 wherein the cache directory is a page level set-associative cache directory wherein each entry corresponds to a page of memory and wherein producing cache directory victim entry information comprises logging cache directory victim entry information for at least one of the eviction conflicts in a log buffer that is accessible by the memory manager.

4. The method of claim 3 wherein the memory comprises a conflict victim buffer that stores a most recently evicted entry from the cache directory wherein monitoring eviction conflicts among cache directory entries comprises reading the conflict victim buffer and wherein logging cache directory victim entry information for at least one of the eviction conflicts in the log buffer is done based on content of the conflict victim buffer.

5. The method of claim 3 wherein logging comprises storing the cache directory victim entry information for the at least one of evicted entries in a kernel memory and reading the cache directory entry information by a virtual memory manager.

6. The method of claim 3 wherein logging comprises storing the cache directory victim entry information for the at least one of evicted entries in the log buffer readable by the hardware control logic.

7. The method of claim 3 comprising changing a page level physical address assignment for a page of memory that moves the page of memory to a different set in the page level set-associative cache directory.

8. The method of claim 1 comprising in response to the logged cache directory victim entry information, re-assigning a physical address for a page of memory within a same memory channel as a priority over assigning a physical address for a page of memory to a different memory channel based on the produced cache directory victim entry information.

9. The method of claim 1 comprising setting one or more configuration registers to control at least one of:
    a sampling rate of a number of conflict evictions that are logged; and
    a count setting that sets a number of eviction conflicts that are to be stored.

10. The method of claim 1 wherein producing comprises exposing to the memory manager, by the hardware control logic, cache directory victim entry information in kernel memory stored in a double buffer configuration.

11. An apparatus comprising:
a plurality of processors that access a cache hierarchy;
memory operative to store a cache directory; and
hardware control logic operative to:
- operate in a multi-mode operation of cache eviction monitoring including either a first mode that provides continuous logging of eviction conflicts, second mode that provides logging of eviction conflicts based on one or more thresholds of conflict evictions being met;
- monitor eviction conflicts among cache directory entries in the cache directory, wherein the cache directory entries correspond to pages which are cached in the cache hierarchy for the plurality of processors;
- in response to an eviction of one or more cache directory entries in the cache directory, wherein the cache directory includes entries corresponding to pages which are cached in the cache hierarchy, produce cache directory victim entry information, for a memory manager that assigns physical address space for pages of memory; and
- the memory manager operative to choose a future page of memory from the physical address space based on the produced cache directory victim entry information.

12. The apparatus of claim 11 wherein the cache directory is a page level set-associative cache directory wherein each entry corresponds to a page of memory and wherein the hardware control logic comprises;
- a conflict victim buffer configured to store a most recent entry evicted from the cache directory; and
- a controller operative to produce cache directory victim entry information from the conflict victim buffer by logging cache directory victim entry information for at least one of the eviction conflicts in a log buffer configured to be readable by a memory manager.

13. The apparatus of claim 12 wherein the hardware control logic comprises the log buffer that is readable and writeable by the controller and the controller is operative to store the cache directory victim entry information for the at least one of evicted entries in the log buffer.

14. The apparatus of claim 12 comprising one or more configuration registers configured to provide control of the controller with data representing at least one of:
- a sampling rate of a number of conflict evictions that are logged; and
- a count setting that sets a number of eviction conflicts that are to be stored.

15. The apparatus of claim 11 comprising:
the memory manager operative to change a page level physical address assignment for a page of memory to a different memory channel based on the produced cache directory victim entry information.

16. The apparatus of claim 11 comprising a scalable data fabric comprising the hardware control logic.

17. A data processing system, comprising:
a host processor;
a memory coupled to the host processor;
a plurality of remote memory devices; and
a scalable data fabric coupled to the host processor and to the plurality of remote memory devices, wherein the scalable data fabric comprises:
hardware control logic operative to:
- operate in a multi-mode operation of cache eviction monitoring including either a first mode that provides continuous logging of eviction conflicts, or a second mode that provides logging of eviction conflicts based on one or more thresholds of conflict evictions being met;
- monitor eviction conflicts among cache directory entries in a cache directory, cache directory entries corresponding to pages which are cached in the system; and
- in response to an eviction of one or more cache directory entries in the cache directory, wherein the cache directory includes entries corresponding to pages which are cached in the system, produce cache directory victim entry information, by logging cache directory victim entry information for at least one of the eviction conflicts in a log buffer, for a memory manager that assigns physical address space for pages of memory in the system; and
- the memory manager operative to choose a future page of memory from the physical address space based on the produced cache directory victim entry information.

18. The data processing system of claim 17 wherein the host processor is operative to change a page level physical address assignment for a page of memory to a different memory channel based on content from a conflict victim buffer.

19. The data processing system of claim 17 wherein the cache directory is a page level set-associative cache directory wherein each entry corresponds to a page of memory and wherein the hardware control logic comprises;
- a conflict victim buffer configured to store a most recent entry evicted from the cache directory; and
- a controller operative to produce cache directory victim entry information from the conflict victim buffer by logging cache directory victim entry information for at least one eviction conflict in the log buffer readable by a memory manager.

20. The data processing system of claim 19 wherein the hardware control logic comprises the log buffer that is readable and writeable by the controller and the controller is operative to store the cache directory victim entry information for the at least one of evicted entries in the log buffer.

21. The data processing system of claim 20 wherein the controller is operative to store the cache directory victim entry information for the at least one of evicted entries in a kernel memory readable by a memory manager.

22. The data processing system of claim 17 comprising the memory manager operative to, in response to the logged cache directory victim entry information, re-assign a physical address for a page of memory within a same memory channel as a priority over assigning a physical address for a page of memory to a different memory channel based on the produced cache directory victim entry information.

23. The data processing system of claim 19 comprising the memory manager operative to change a page level physical address assignment for a page of memory that moves the page of memory to a different set in the page level set-associative cache directory.

24. The data processing system of claim 19 comprising one or more configuration registers configured to provide control of the controller with data representing at least one of:
- a sampling rate of a number of conflict evictions that are logged; and
- a count setting that sets a number of eviction conflicts that are to be stored.

* * * * *